(12) United States Patent
Gashgaee (10) Patent No.: US 7,547,049 B2
(45) Date of Patent: Jun. 16, 2009

(54) O-RING-LESS LOW PROFILE FITTINGS AND FITTING ASSEMBLIES

(75) Inventor: Iraj Gashgaee, Marlborough, MA (US)

(73) Assignee: Entegris, Inc., Chaska, MN (US)

( * ) Notice: Subject to any disclaimer, the term of this patent is extended or adjusted under 35 U.S.C. 154(b) by 104 days.

(21) Appl. No.: 11/602,513

(22) Filed: Nov. 20, 2006

(65) Prior Publication Data

US 2007/0126233 A1    Jun. 7, 2007

Related U.S. Application Data

(60) Provisional application No. 60/741,667, filed on Dec. 2, 2005.

(51) Int. Cl.
*F16L 25/00*    (2006.01)
(52) U.S. Cl. .................... 285/384; 285/124.5
(58) Field of Classification Search ........... 285/384, 285/385, 353, 124.4, 124.5
See application file for complete search history.

(56) References Cited

U.S. PATENT DOCUMENTS

| | | | | |
|---|---|---|---|---|
| 269,626 A | * | 12/1882 | Bodel et al. | 285/384 |
| 826,018 A | * | 7/1906 | Concoff | 285/353 |
| 1,664,125 A | * | 3/1928 | Lowrey | 285/384 |
| 2,153,664 A | * | 4/1939 | Freedlander | 285/353 |
| 2,215,505 A | | 9/1940 | Hollander | |
| 2,328,468 A | * | 8/1943 | Laffly | 285/384 |
| 2,457,384 A | * | 12/1948 | Krenz | 285/384 |
| 2,631,538 A | | 3/1953 | Johnson | |
| 2,673,522 A | | 3/1954 | Dickey | |
| 2,757,966 A | * | 8/1956 | Samiran | 285/332 |
| 3,072,058 A | | 1/1963 | Christopher et al. | |
| 3,227,279 A | | 1/1966 | Bockelman | |
| 3,327,635 A | | 6/1967 | Sachnik | |

(Continued)

FOREIGN PATENT DOCUMENTS

AU    B-78872/87    4/1988

(Continued)

OTHER PUBLICATIONS

International Search Report and Written Opinion, PCT/US2006/045176 Apr. 21, 2008, 9 pgs.

(Continued)

*Primary Examiner*—David E Bochna
(74) *Attorney, Agent, or Firm*—Sprinkle IP Law Group (57) ABSTRACT

Embodiments of the invention provide new fittings and fitting assemblies for tight, leak-proof filter and fluid connections in a pump useful in dispensing fluid onto wafers during a semiconductor manufacturing process. One embodiment of a fitting assembly comprises an o-ring-less low profile fitting and a low profile male threaded locking nut. A manifold of the pump is machined with a female threaded hole for receiving the fitting and the locking nut. The fitting has higher compressibility than the manifold. Initially, as one end of the fitting touches the bottom of the receiving hole, there is a small gap between the end of the fitting and the bottom of the receiving hole. As the fitting is pressed down, the end of the fitting that touches the bottom of the receiving hole begins to deform and fill the small gap, thus creating a tight seal between the fitting and the manifold.

18 Claims, 9 Drawing Sheets

U.S. PATENT DOCUMENTS

| | | | |
|---|---|---|---|
| 3,623,661 A | 11/1971 | Wagner | |
| 3,741,298 A | 6/1973 | Canton | |
| 3,895,748 A | 7/1975 | Klingenberg | |
| 3,954,352 A | 5/1976 | Sakai | |
| 4,023,592 A | 5/1977 | Patzke | |
| 4,093,403 A | 6/1978 | Schrimpf | |
| 4,452,265 A | 6/1984 | Lonnebring | |
| 4,483,665 A | 11/1984 | Hauser | |
| 4,541,455 A | 9/1985 | Hauser | |
| 4,597,719 A | 7/1986 | Tano | |
| 4,597,721 A | 7/1986 | Santefort | |
| 4,601,409 A | 7/1986 | DiRegolo | |
| 4,614,438 A | 9/1986 | Kobayashi | |
| 4,671,545 A * | 6/1987 | Miyazaki | 285/384 |
| 4,690,621 A | 9/1987 | Swain | |
| 4,705,461 A | 11/1987 | Clements | |
| 4,808,077 A | 2/1989 | Kan et al. | |
| 4,821,997 A | 4/1989 | Zdeblick | |
| 4,824,073 A | 4/1989 | Zdeblick | |
| 4,865,525 A | 9/1989 | Kern | |
| 4,915,126 A | 4/1990 | Gyllinder | |
| 4,943,032 A | 7/1990 | Zdeblick | |
| 4,950,134 A | 8/1990 | Bailey et al. | |
| 4,952,386 A | 8/1990 | Davison | |
| 4,966,646 A | 10/1990 | Zdeblick | |
| 5,061,156 A | 10/1991 | Kuehne | |
| 5,061,574 A | 10/1991 | Henager, Jr. | |
| 5,062,770 A | 11/1991 | Story | |
| 5,134,962 A | 8/1992 | Amada | |
| 5,135,031 A | 8/1992 | Burgess | |
| 5,167,837 A | 12/1992 | Snodgrass | |
| 5,192,198 A | 3/1993 | Gebauer | |
| 5,261,442 A | 11/1993 | Kingsford | |
| 5,262,068 A | 11/1993 | Bowers | |
| 5,316,181 A | 5/1994 | Burch | |
| 5,344,195 A * | 9/1994 | Parimore et al. | 285/353 |
| 5,350,200 A * | 9/1994 | Peterson et al. | 285/353 |
| 5,380,019 A | 1/1995 | Hillery | |
| 5,434,774 A | 7/1995 | Seberger | |
| 5,476,004 A | 12/1995 | Kingsford | |
| 5,490,765 A | 2/1996 | Bailey | |
| 5,511,797 A | 4/1996 | Nikirk | |
| 5,516,429 A | 5/1996 | Snodgrass | |
| 5,527,161 A | 6/1996 | Bailey | |
| 5,546,009 A | 8/1996 | Raphael | |
| 5,575,311 A | 11/1996 | Kingsford | |
| 5,580,103 A | 12/1996 | Hall | |
| 5,599,100 A | 2/1997 | Jackson et al. | |
| 5,599,394 A | 2/1997 | Yabe | |
| 5,645,301 A | 7/1997 | Kingsford | |
| 5,652,391 A | 7/1997 | Kingsford | |
| 5,653,251 A | 8/1997 | Handler | |
| 5,743,293 A | 4/1998 | Kelly | |
| 5,762,795 A | 6/1998 | Bailey | |
| 5,772,899 A | 6/1998 | Snodgrass | |
| 5,785,508 A | 7/1998 | Bolt | |
| 5,793,754 A | 8/1998 | Houldsworth et al. | |
| 5,839,828 A | 11/1998 | Glanville | |
| 5,848,605 A | 12/1998 | Bailey | |
| 5,947,702 A | 9/1999 | Biederstadt | |
| 5,971,723 A | 10/1999 | Bolt | |
| 5,991,279 A | 11/1999 | Haugli et al. | |
| 6,033,302 A | 3/2000 | Ahmed et al. | |
| 6,105,829 A | 8/2000 | Snodgrass | |
| 6,190,565 B1 | 2/2001 | Bailey | |
| 6,238,576 B1 | 5/2001 | Yajima | |
| 6,250,502 B1 | 6/2001 | Cote | |
| 6,251,293 B1 | 6/2001 | Snodgrass | |
| 6,302,660 B1 | 10/2001 | Kurita | |
| 6,318,971 B1 | 11/2001 | Ota | |
| 6,325,932 B1 | 12/2001 | Gibson | |
| 6,330,517 B1 | 12/2001 | Dobrowskli | |
| 6,348,124 B1 | 2/2002 | Garbett | |
| 6,470,950 B2 | 10/2002 | Shimizu | |
| 6,474,950 B1 | 11/2002 | Waldo | |
| 6,478,547 B1 | 11/2002 | Savard | |
| 6,506,030 B1 | 1/2003 | Kottke | |
| 6,540,265 B2 * | 4/2003 | Turk | 285/384 |
| 6,554,579 B2 | 4/2003 | Martin | |
| 6,592,825 B2 | 7/2003 | Pelc et al. | |
| 6,635,183 B2 | 10/2003 | Gibson | |
| 6,742,992 B2 | 6/2004 | Davis | |
| 6,742,993 B2 | 6/2004 | Savard | |
| 6,767,877 B2 | 7/2004 | Kuo | |
| 6,837,484 B2 | 1/2005 | Kingsford | |
| 6,901,791 B1 | 6/2005 | Frenz et al. | |
| 6,925,072 B1 | 8/2005 | Grohn | |
| 6,952,618 B2 | 10/2005 | Davlin et al. | |
| 7,013,223 B1 | 3/2006 | Zhang et al. | |
| 7,029,238 B1 | 4/2006 | Zagars | |
| 7,063,785 B2 | 6/2006 | Hiraku et al. | |
| 7,083,202 B2 * | 8/2006 | Eberle et al. | 285/124.4 |
| 7,247,245 B1 | 7/2007 | Proulx et al. | |
| 7,272,452 B2 | 9/2007 | Coogan et al. | |
| 7,383,967 B2 | 6/2008 | Gibson | |
| 2002/0044536 A1 | 4/2002 | Izumi et al. | |
| 2002/0095240 A1 | 7/2002 | Sickinger | |
| 2003/0148759 A1 | 8/2003 | Leliveld | |
| 2003/0222798 A1 | 12/2003 | Floros | |
| 2004/0050771 A1 | 3/2004 | Gibson | |
| 2004/0072450 A1 | 4/2004 | Collins | |
| 2004/0133728 A1 | 7/2004 | Ellerbrock et al. | |
| 2005/0061722 A1 | 3/2005 | Takao et al. | |
| 2005/0126985 A1 | 6/2005 | Campbell | |
| 2005/0184087 A1 | 8/2005 | Zagars | |
| 2005/0232296 A1 | 10/2005 | Schultze et al. | |
| 2005/0238497 A1 | 10/2005 | Holst | |
| 2006/0015294 A1 | 1/2006 | Yetter Jr. et al. | |
| 2006/0070960 A1 | 4/2006 | Gibson | |
| 2006/0083259 A1 | 4/2006 | Metcalf et al. | |
| 2008/0089361 A1 | 4/2008 | Metcalf et al. | |

FOREIGN PATENT DOCUMENTS

| | | |
|---|---|---|
| CA | 1271140 | 7/1990 |
| DE | 299 09 100 U1 | 8/1999 |
| EP | 0 249 655 A | 12/1987 |
| EP | 0 410 394 A | 1/1991 |
| EP | 0261972 B1 | 12/1992 |
| EP | 0863538 A2 | 9/1998 |
| EP | 0867649 A2 | 9/1998 |
| EP | 0892204 A2 | 1/1999 |
| EP | 1133639 B1 | 6/2004 |
| GB | 661 522 A | 11/1951 |
| JP | 11 026430 A | 1/1999 |
| WO | 96/35876 A | 11/1996 |
| WO | WO 00/31416 A1 | 6/2000 |
| WO | WO 2001040646 A3 | 6/2001 |
| WO | WO 02/090771 A2 | 11/2002 |
| WO | WO 2006057957 A2 | 6/2006 |

OTHER PUBLICATIONS

International Search Report and Written Opinion issued in PCT/US07/05377 mailed Jun. 4, 2008, 13 pgs.
Chinese Patent Office Official Action (and translation), Chinese Patent Application No. 2005101088364 dated May 23, 2008, 6 pgs.
International Search Report and Written Opinion issued in PCT/US06/44985, mailed Jun. 23, 2008, 7 pgs.
International Search Report and Written Opinion issued in PCT/US07/17017, dated Jul. 3, 2008, 9 pages.
International Search Report and Written Opinion issued in PCT/US06/44981, dated Aug. 8, 2008, 10 pages.
Office Action issued in U.S. Appl. No. 11/365,395, dated Aug. 19, 2008, McLoughlin, 19 pages.

Office Action issued in U.S. Appl. No. 11/292,559, dated Aug. 28, 2008, Gonnella, 19 pages.
Notification of Transmittal of International Preliminary Report on Patentability for PCT/US07/17017. Eight pages, dated Jan. 13, 2009.
International Preliminary Report on Patentability, Chap. I, issued in PCT/US2006/044981, mailed Nov. 6, 2008, 7 pgs.
International Preliminary Report on Patentability, Chap. II, issued in PCT/US2006/044981, mailed Feb. 2, 2009, 9 pgs.
Office Action issued in U.S. Appl. No. 11/365,395, mailed Feb. 2, 2009, McLoughlin, 18 pgs.
Office Action issued in U.S. Appl. No. 11/364,286, dated Nov. 14, 2008, Gonella, 11 pages.
European Patent Office Action, European Patent Application No. 00982386.5, Sep. 4, 2007.
International Search Report and Written Opinion, PCT/US2006/044906, Sep. 5, 2007.
International Search Report and Written Opinion, PCT/US2005/042127, Sep. 26, 2007.
International Search Report and Written Opinion, PCT/US2006/044980, Oct. 4, 2007.
Two-page brochure describing a Chempure Pump—A Furon Product.
Fifteen-page publication regarding "Characterization of Low Viscosity Photoresist Coating," Murthy S. Krishna, John W. Lewellen, Gary E. Flores. Advances in Resist Technology and Processing XV (Proceedings of SPIE (The International Society of Optical Engineering), Feb. 23-25, 1998, Santa Clara, California. vol. 3333 (Part Two of Two Parts).
U.S. Patent Office Official Action issued Dec. 13, 2007 in U.S. Appl. No. 11/051,576, Raymond A. Zagars, Dec. 13, 2007.
Chinese Patent Office Official Action, Chinese Patent Application No. 200410079193.0, Mar. 23, 2007.
International Search Report and Written Opinion, PCT/US2006/045127, May 23, 2007.
International Search Report and Written Opinion, PCT/US2006/044908, Jul. 16, 2007.
International Search Report and Written Opinion, PCT/US2006/045175, Jul. 25, 2007.
International Search Report and Written Opinion, PCT/US2006/044907, Aug. 8, 2007.
International Search Report and Written Opinion, PCT/US2006/045177, Aug. 9, 2007.

* cited by examiner

O-RING-LESS LOW PROFILE FITTINGS AND FITTING ASSEMBLIES

CROSS-REFERENCE TO RELATED APPLICATION(S)

The present application claims priority from U.S. Provisional Patent Application No. 60/741,667, filed Dec. 2, 2005, entitled "O-RING-LESS LOW PROFILE FITTING AND ASSEMBLY THEREOF," which is incorporated herein by reference for all purposes.

TECHNICAL FIELD OF THE INVENTION

This invention relates generally to fluid pumps. More particularly, embodiments of the present invention relate to low profile fittings and fitting assemblies for filter and fluid connections useful in eliminating leaks and associated pressure changes in fluid pumps.

BACKGROUND OF THE INVENTION

There are many applications for which precise control over the amount and/or rate at which a fluid is dispensed by a pumping apparatus is necessary. In semiconductor processing, for example, it is important to control the amount and rate at which photochemicals, such as photoresist chemicals, are applied to a semiconductor wafer. The coatings applied to semiconductor wafers during processing typically require a certain flatness and/or even thickness across the surface of the wafer that is measured in angstroms. The rates at which processing chemicals are applied (i.e., dispensed) onto the wafer have to be controlled carefully to ensure that the processing liquid is applied uniformly.

Photochemicals used in the semiconductor industry today are typically very expensive, costing as much as $1000 and up per a liter. Therefore, it is highly desirable to ensure that a minimum but adequate amount of chemical is used and that the chemical is not damaged by the pumping apparatus.

Unfortunately, these desirable qualities can be extremely difficult to achieve in today's pumping systems because of the many interrelated obstacles. For instance, an o-ring is often needed in a fitting assembly to improve the seal of a filter or fluid connection, between a surface of the fitting and a receiving surface of a block to which the fitting is attached. O-rings generally deteriorate over a period of time, causing the fitting assembly to become leaky, wasting precious fluid and causing undesirable pressure changes. Such pressure changes may be damaging to the fluid (i.e., may change the physical characteristics of the fluid unfavorably) and/or adversely affect the performance of the pumping system.

Moreover, previously developed fittings and fitting assemblies tend to be bulky and therefore are not suitable to be used in pumps with a small footprint and height limitation. There is a need for an o-ring-less low profile fitting and fitting assembly for filter and fluid connections in a fluid pump.

Embodiments of the invention can address these needs and more.

SUMMARY OF THE INVENTION

Embodiments of the present invention provide new fittings and fitting assemblies that substantially eliminate or reduce the disadvantages of fittings in previously developed pumping systems and methods. More particularly, embodiments of the present invention provide an o-ring-less low profile fitting and assembly thereof that can eliminate the possibility of leaks due to the presence of o-rings.

One embodiment of the present invention provides o-ring-less low profile fittings and fitting assemblies for filter and fluid connections in a fluid pump useful in a semiconductor manufacturing process.

Another embodiment of the present invention provides a low profile fitting assembly comprised of an o-ring-less low profile fitting and a low profile male threaded locking nut.

In one embodiment, a manifold (e.g., dispense block) is machined with one or more female threaded holes, each for correspondingly receiving both the o-ring-less low profile fitting and the low profile male threaded locking nut. Specifically, each receiving hole has a bottom portion that matches one end of the o-ring-less low profile fitting and a female threaded portion that matches the male threaded portion of the low profile locking nut. The manifold is made of a first material and the fitting is made of a second material. The second material is different from the first material and has higher compressibility than the first material. The o-ring-less low profile fitting is secured onto the manifold with the locking nut. Initially, as one end of the fitting touches the bottom of the receiving hole, there is a small gap between the end of the fitting and the bottom of the receiving hole. As the fitting is pressed down, the end of the fitting that touches the bottom of the receiving hole begins to deform and fill the small gap, thus completing the seal and eliminating leaks between the fitting and the manifold.

In one embodiment, the o-ring-less low profile fitting is pressed down by the locking nut. In another embodiment, the o-ring-less low profile fitting is pressed down by a tube, which is pressed down by the locking nut.

Advantages provided by embodiments of the present invention can be numerous. As an example, since there are no o-rings, all prior problems associated with o-rings are eliminated. There is no possibility of leaks caused by missing o-rings and/or deterioration of o-rings. In addition, in a fitting assembly, the low profile of the fitting reduces forces on the locking nut when a tube attached thereto is moved, thus reducing unscrewing issues. Moreover, the o-ring-less and low profile design reduces the costs of machining.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein.

DETAILED DESCRIPTION

Preferred embodiments of the present invention are described below with reference to the figures which are not necessarily drawn to scale and where like numerals are used to refer to like and corresponding parts of the various drawings.

Embodiments of the present invention are directed to fittings and fitting assemblies for fluid and filter connections in a pumping system. Such a pumping system may employ a multiple stage ("multi-stage") pump for feeding and accurately dispensing fluid onto wafers during a semiconductor manufacturing process. Specifically, embodiments of the present invention provide o-ring-less low profile fittings and assemblies thereof for filter and fluid connections in the multi-stage pump. It should be noted that the multi-stage pump and the pumping system embodying such a pump as described herein are provided by way of example, but not limitation, and embodiments of the present invention can be utilized and/or suitably implemented for other pump designs and configurations. Embodiments of o-ring-less low profile fittings and fitting assemblies will be described in more details below.

Figure 1:
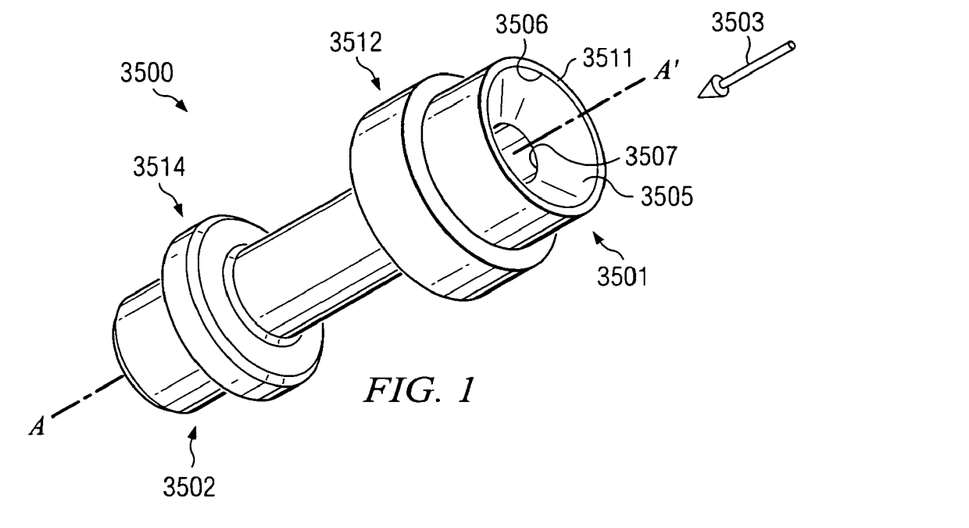
FIG. 1 is a schematic representation of a fitting, according to one embodiment of the invention.
Figure 2:
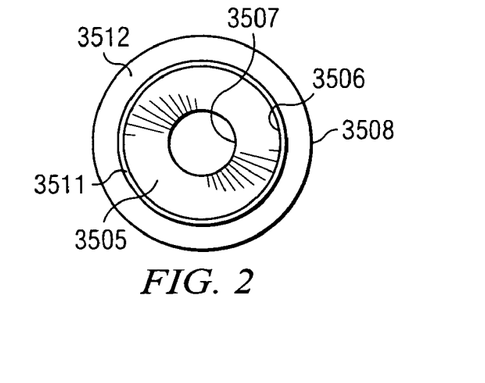
FIG. 2 is a top view of the fitting of FIG. 1, according to one embodiment of the invention.

FIG. 1 is a schematic representation of an o-ring-less low profile fitting 3500 according to one embodiment of the invention. One end of fitting 3500 has a fitting seal surface that is shaped, formed or otherwise structured to mate with a receiving seal surface, which can be part of a receiving hole machined out of a block (e.g., dispense block 205 of FIGS. 7-15). The other end of fitting 3500 can be shaped, formed or otherwise structured to receive or fit into a tubular connection (e.g., a tube), which can be of any desirable size and configuration, depending upon applications (e.g., to connect a filter). In the exemplary embodiment shown in FIG. 1, fitting 3500 has a first end 3501 and a second end 3502. A top view of fitting 3500 in a direction as indicated by arrow 3503 is shown in FIG. 2. A cross-sectional view of fitting 3500 as indicated by line A-A' is shown in FIG. 3.

Figure 3:
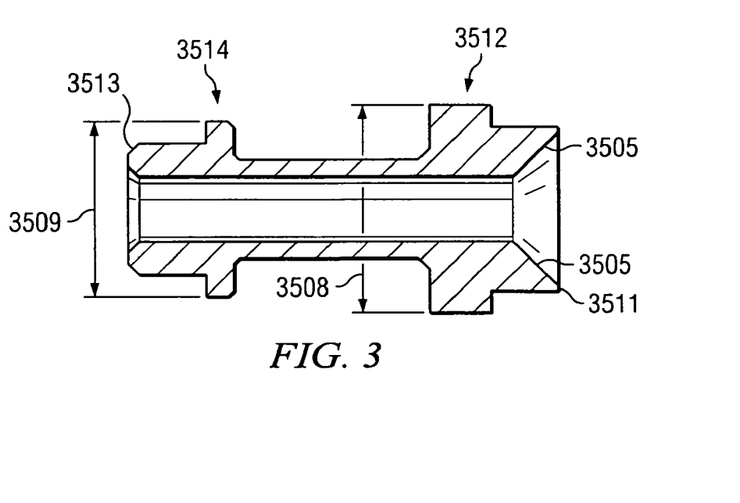
FIG. 3 is a cross-sectional view of the fitting of FIG. 1, according to one embodiment of the invention.

Referring to FIGS. 1-3, first end 3501 has a seal surface 3505 that is defined by a first diameter 3506 and a second diameter 3507. First diameter 3506 is the inner diameter (I.D.) of rim 3511, which is located at the very end of first end 3501 of fitting 3500. Second diameter 3507 is the inner diameter of fitting 3500 (i.e., the thru hole of fitting 3500). Seal surface 3505 slops (e.g., 86 degrees) from first diameter 3506 to second diameter 3507, which, according to one embodiment, begins shortly before protuberance 3512. In this example, protuberance 3512 can be seen as part of a support structure that supports seal surface 3505 and characterizes first end 3501. Second end 3502 is characterized by protuberance 3514 and contour 3513 around its opening. Second end 3502 can be of any suitable application-specific shapes and sizes. More specifically, second end 3502 can be shaped, formed, or otherwise structured to fit various types of tubes and tube-like connectors, depending upon applications. In the exemplary embodiment shown in FIGS. 1-3, protuberance 3512 and protuberance 3514 have different diameters. Specifically, diameter 3508 of protuberance 3512 is larger than diameter 3509 of protuberance 3514. The difference between diameter 3508 and diameter 3509 allows a locking nut to slide over protuberance 3514 and be stopped by protuberance 3512. One embodiment of such a locking nut for fitting 3500 will be described below in more details with reference to FIGS. 4-9.

As illustrated in FIGS. 1-3, fitting 3500 is made out of a block, rod, or other shaped piece of material. According to one embodiment, fitting 3500 is made of a material that has a higher compressibility (i.e., softer) than that of the material of the receiving seal surface at the receiving end (e.g., a female-threaded receiving hole machined out of dispense block 205 of FIGS. 7-15). In one embodiment, fitting 3500 is made of Teflon® PFA and dispense block 205 is made of PTFE or modified PTFE As one skilled in the art can appreciate, the latter is a harder material (i.e., has lower compressibility) than the former.

Figure 4:
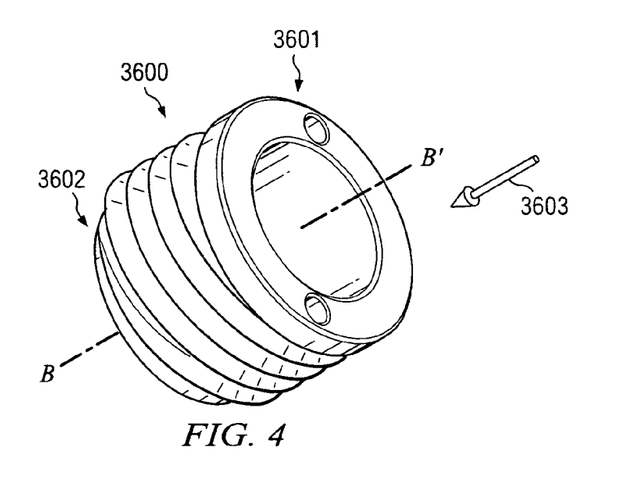
FIG. 4 is a schematic representation of a locking nut for the embodiment of fitting of FIG. 1.
Figure 5:
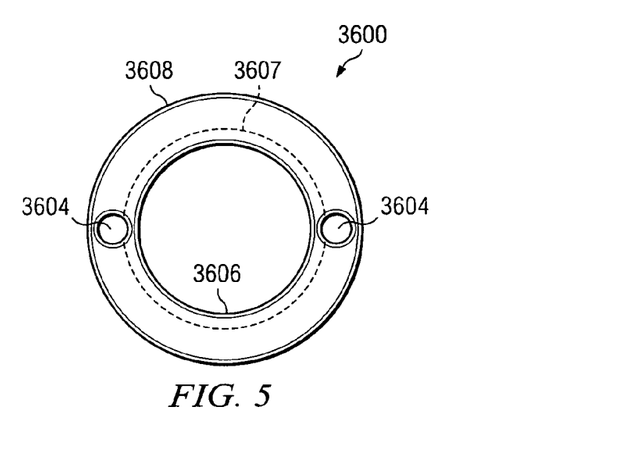
FIG. 5 is a top view of the locking nut of FIG. 4, according to one embodiment of the invention.
Figure 6:
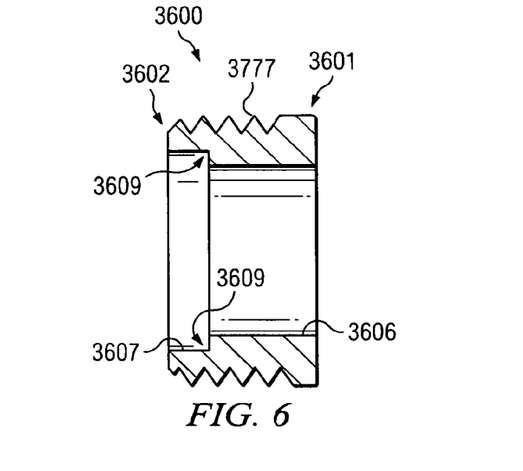
FIG. 6 is a cross-sectional view of the locking nut of FIG. 4, according to one embodiment of the invention.
Figure 7:
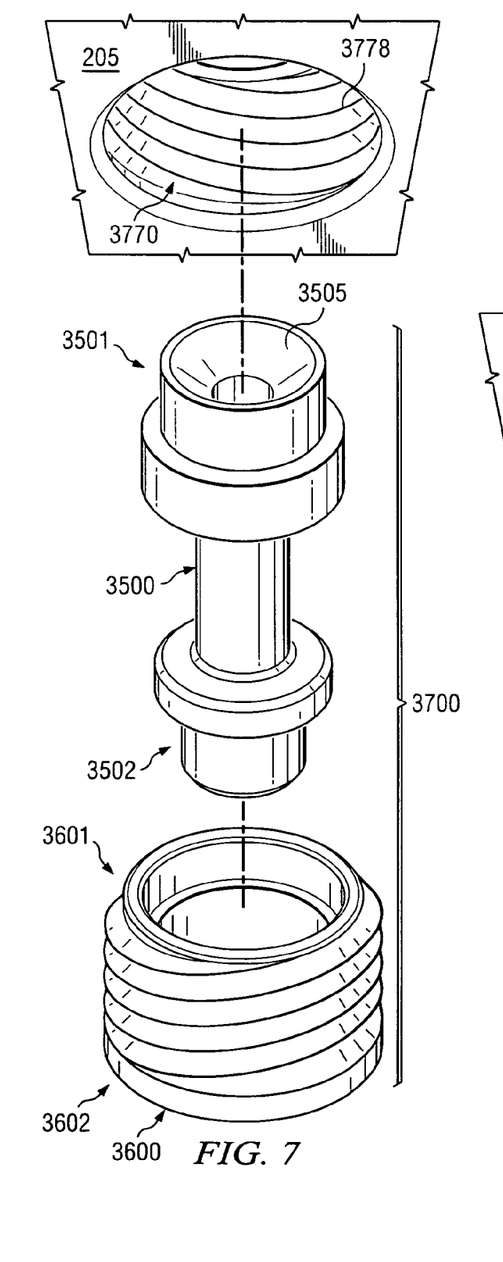
FIG. 7 is a perspective view of a fitting assembly to be installed on a block, according to one embodiment of the invention.

FIG. 4 is a schematic representation of a locking nut 3600 for locking fitting 3500 onto a receiving end (e.g., receiving hole 3770 on dispense block 205 of FIG. 7). In the exemplary embodiment shown in FIG. 4, locking nut 3600 has a first end 3601 and a second end 3602. A top view of locking nut 3600 in a direction as indicated by arrow 3603 is shown in FIG. 5. A cross-sectional view of locking nut 3600 as indicated by line B-B' is shown in FIG. 6.

Referring to FIGS. 4-6, first end 3601 may have a flat surface with holes 3604 to facilitate the use of a tool (e.g., securely locking fitting 3500 onto dispense block 205 using a torque wrench or other appropriate tools capable of providing about 8-10 in./lb torque). In embodiments of the invention, locking nut 3600 has a very low profile, which means that once locking nut 3600 secures fitting 3500 onto dispense block 205, only a small portion of first end 3601 of locking nut 3600 would protrude from dispense block 205. In one embodiment, the low profile design of locking nut 3600 reduces the protrusion after installation to be less than about 0.2 inch in height. This low profile design is one characteristic of locking nut 3600.

Another characteristic of locking nut 3600 is that it is male-threaded. As shown in FIG. 6, lock nut 3600 has male threads 3777. It should be understood that male threads 3777 as shown in FIG. 6 are meant to be exemplary. The number as well as size of male threads 3777 can be implemented to suit, so long as the female threads of the receiver (e.g., receiving hole 3770 of block 205 of FIG. 7) at the receiving end match male threads 3777.

As FIG. 6 illustrates, first end 3601 and second end 3602 can, but not required to, have about the same outer diameters. In this example, first end 3601 and second end 3602 have same outer diameter 3608 and different inner diameters 3606 and 3607. Inner diameter 3606 at first end 3601 is smaller than inner diameter 3607 at second end 3602. As a result, second end 3602 has a recess area 3609, which is another characteristic of locking nut 3600. Recess area 3609 is useful in compressing down first end 3501 of fitting 3500 to ensure a secure fit and tight seal between fitting 3500 and dispense block 205, which will be described in more details below with reference to FIGS. 7-9.

FIG. 7 is a perspective view of a fitting assembly to be assembled on a manifold (e.g., dispense block 205), according to one embodiment of the invention. Just about any manifold (i.e., a chamber or pipe with one or more openings for receiving and/or distributing a fluid or gas) maybe built or adapted to utilize embodiments of the invention disclosed herein. As an example, a portion of dispense block 205 is shown in FIGS. 7-15. The drawings are not meant to be limiting as receivers for fitting assembly 3700 can be suitably implemented depending upon applications. For example, dispense block 205 can be part of pump 100, which will be described in more details below with reference to FIGS. 10 and 15. Other implementations of suitable manifolds with appropriate receivers for fitting assembly 3700 are also possible and are not limited to dispense block 205 as shown in FIGS. 7-15.

Figure 9:
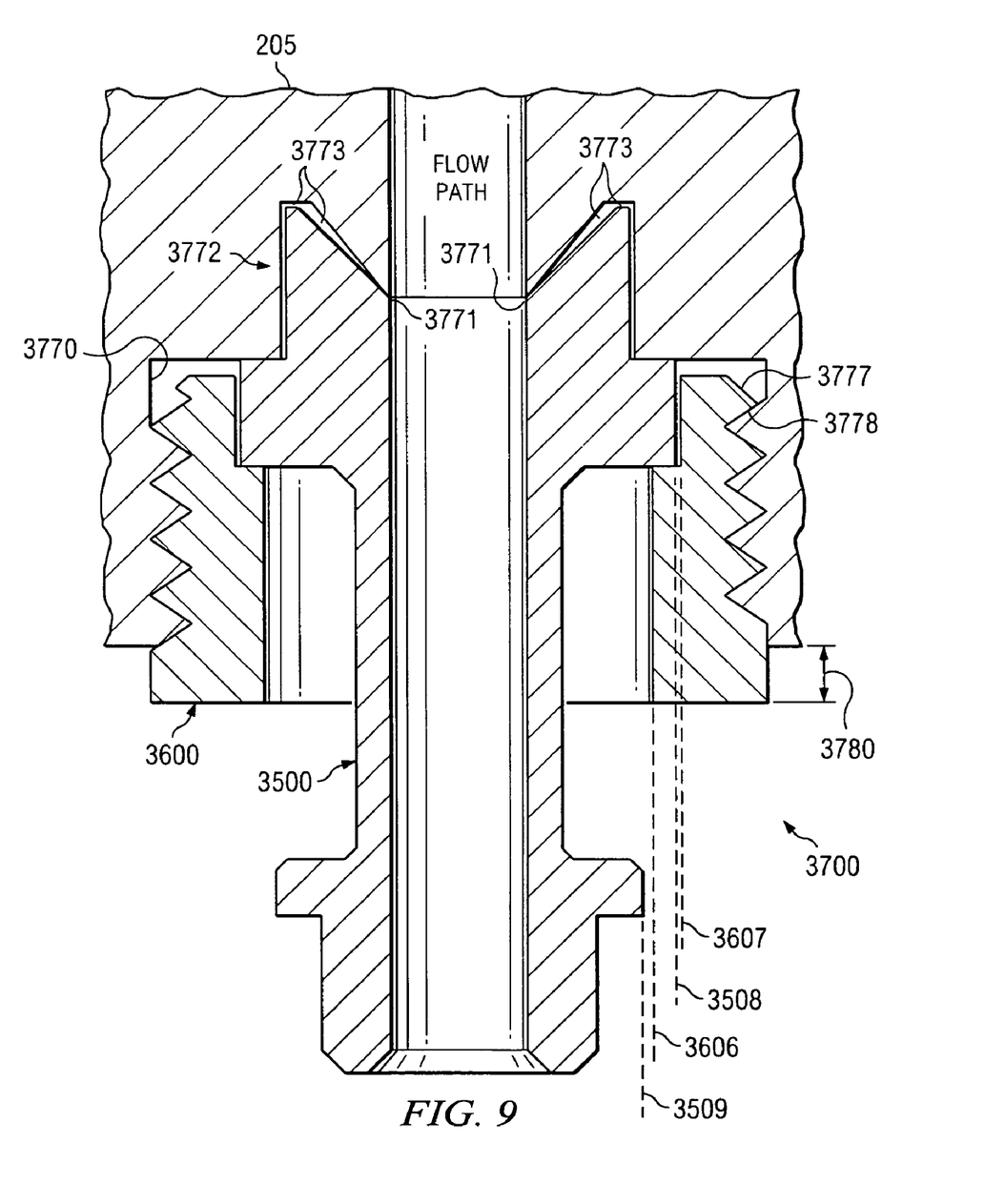
FIG. 9 is a cross-sectional view of the fitting assembly of FIG. 7, according to one embodiment of the invention.

In this example, fitting assembly 3700 comprises fitting 3500 and locking nut 3600. As exemplified in FIG. 7, to install fitting 3500 and locking nut 3600 onto dispense block 205, fitting 3500 is positioned between locking nut 3600 and dispense block 205. Second end 3602 of locking nut 3600 is positioned to face dispense block 205, while first end 3501 of fitting 3500 is positioned towards dispense block 205 so that seal surface 3505 faces dispense block 205. As illustrated in FIG. 9, inner diameter 3606 of locking nut 3600 is larger than outer diameter 3509 of protuberance 3514 and smaller than outer diameter 3508 of protuberance 3512. In this way, locking nut 3600 can slide over protuberance 3514 of fitting 3500 and recess area 3609 of locking nut 3600, which is defined by inner diameter 3607, can serve as a stopper. That is, as male threads 3777 of locking nut 3600 are met with female threads 3778 of receiving hole 3770, which are machined to receive accordingly, and screw fitting 3500 in place, recess area 3609 catches protuberance 3512 of fitting 3500 and presses it down.

Figure 8:
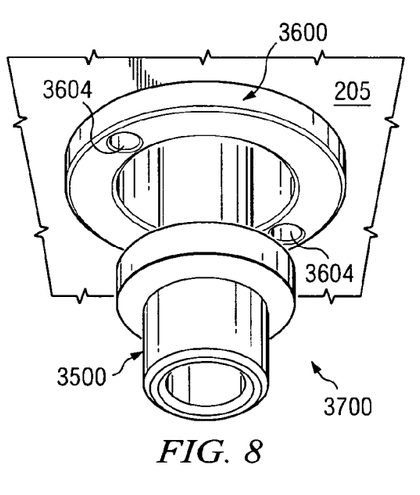
FIG. 8 is a perspective view of the fitting assembly of FIG. 7 installed on the block, according to one embodiment of the invention.

FIG. 8 is a perspective view of fitting assembly 3700 as assembled on dispense block 205, according to one embodiment of the invention. As described above with reference to FIG. 5, holes 3604 on locking nut 3600 can facilitate locking fitting 3500 onto dispense block 205. Due to the unique design of fitting assembly 3700, locking fitting 3500 completes a seal between fitting 3500 and dispense block 205, thereby creating a tight or perfect closure that prevents the entrance or escape of a fluid or gas. Details on how such a seal is created will be described below with reference to FIG. 9. After locking fitting 3500 onto dispense block 205, fitting assembly 3700 is ready for use via second end 3502 of fitting 3500.

FIG. 9 is a cross-sectional view of fitting assembly 3700 of FIGS. 7-8. In this example, receiving hole 3770 is machined out of dispense block 205. The interior (e.g., dimension and configuration) of receiving hole 3770 substantially matches part of the exterior of first end 3501 of fitting 3500 in conjunction with the exterior of locking nut 3600. More specifically, as shown in FIG. 9, the interior of receiving hole 3770 has female threads 3778 that matches male threads 3777 of locking nut 3600 and a recess area 3772 that matches seal surface 3505 and the contour of first end 3501 of fitting 3500.

As locking nut 3600 screws fitting 3500 in place, recess area 3609 of locking nut 3600 catches protuberance 3512 of fitting 3500 and presses it down. Initially, part of first end 3501 of fitting 3500 touches part of receiving hole 3770 at points 3771 (i.e., where seal surface 3505 interfaces with inner diameter 3507, see FIG. 9) and there may be one or more slight gaps 3773 between surfaces of first end 3501 and receiving hole 3770. Gaps 3773 are shown exaggerated in FIG. 9 for the purpose of illustration. The actual amount of gaps may vary from implementation to implementation.

As fitting 3500 is pressed down by locking nut 3600, part of first end 3501 of fitting 3500 begins to deform. Such a deformation is possible because fitting 3500 is designed to be made of a softer material (i.e., has higher compressibility) than that of dispense block 205. Locking nut 3600 is made of a material harder than that of fitting 3500. Thus, as locking nut 3600 continues to press fitting 3500 down against dispense block 205 (i.e., by tightening locking nut 3600 with a tool such as a torque wrench), rim 3511 of fitting 3500 deforms to fill gaps 3773 and completes the seal between fitting 3500 and dispense block 205.

Figure 10:
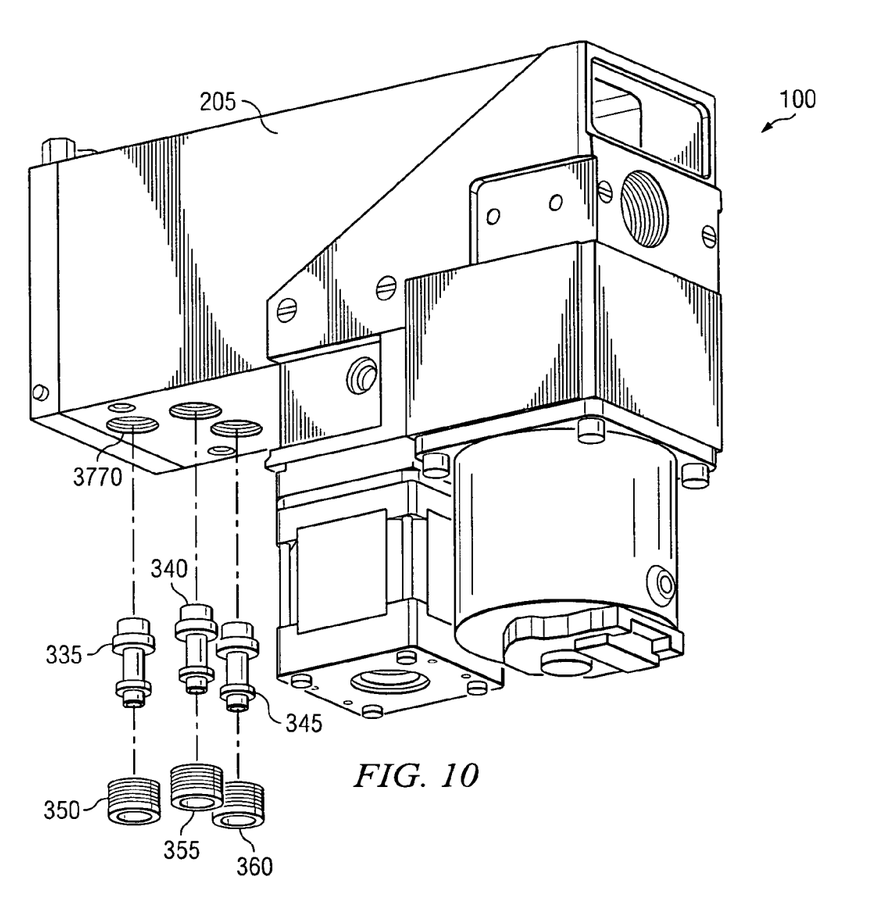
FIG. 10 is a diagrammatic representation of a partial assembly of a multiple stage pump ("multi-stage pump") utilizing embodiments of the invention.

FIG. 10 is a diagrammatic representation of a partial assembly of pump 100 utilizing embodiments of the invention. More specifically, FIG. 10 illustrates adding filter fittings 335, 340, and 345 to dispense block 205. In this example, nuts 350, 355, 360 are used to hold filter fittings 335, 340, 345. According to one embodiment, a low profile filter fitting (e.g., filter fitting 335) and a corresponding low profile nut (e.g., nut 350) made up a low profile filter connection (i.e., fitting assembly). Low profile filter connections allow a filter (e.g., filter 120) to be closely attached to dispense block 205, which helps to reduce the overall dimension of pump 100. As an example, filter fittings 335, 340, 345 implement embodiments of fitting 3500 and nuts 350, 355, 360 implement embodiments of locking nut 3600 as described above with reference to FIGS. 1-9. Each filter fitting leads to one of the flow passages of dispense block 205 (e.g., a feed chamber, vent outlet, dispense chamber, etc.). Pump 100 can be a multi-stage or single stage pump. Examples of pump 100 can be found in U.S. patent application Ser. No. 11/602,464, filed Nov. 20, 2006, entitled "SYSTEM AND METHOD FOR MULTIPLE-STAGE PUMP WITH REDUCED FORM FACTOR" by Gonnella et al., the content of which is incorporated herein by reference.

Figure 11:
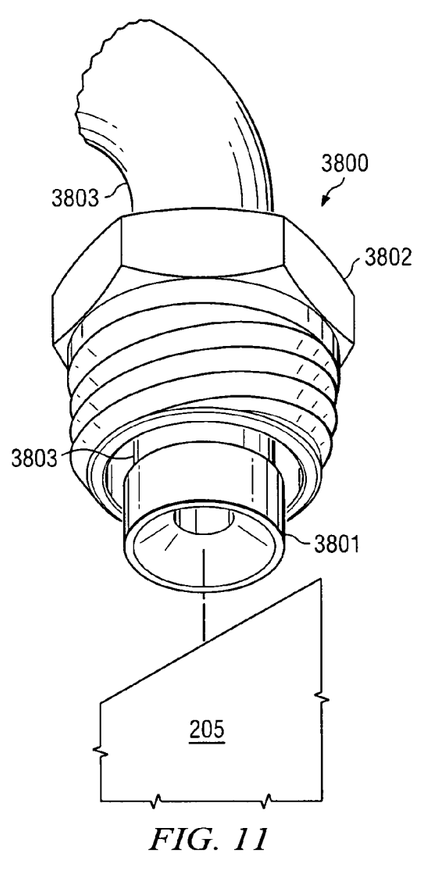
FIG. 11 is a perspective view of a tube to be connected to a block utilizing the fitting assembly, according to another embodiment of the invention.

FIG. 11 is a perspective view of a tube to be connected to a manifold through an o-ring-less low profile fitting assembly, according to another embodiment of the invention. More specifically, FIG. 11 illustrates one embodiment of a fluid fitting assembly 3800 having a locking nut 3802 and a fitting 3801. In this example, fitting 3801 is pressed into one end of tube 3803. Locking nut 3802, like locking nut 3600 described above, is male threaded on the outside and hollow on the inside (i.e., has a through hole). As one in the art can appreciate, locking nut 3802 is not limited to what is shown in FIG. 11 and can be modified to suit, so long as it allows tube 3803 to slide through with fitting 3801 and can be threaded onto dispense block 205. For example, locking nut 3802 can be modified with features such as holes 3604 of locking nut 3600 to facilitate the use of a tool. Furthermore, locking nut 3802 need not have a hexagon-shaped head.

Figure 14:
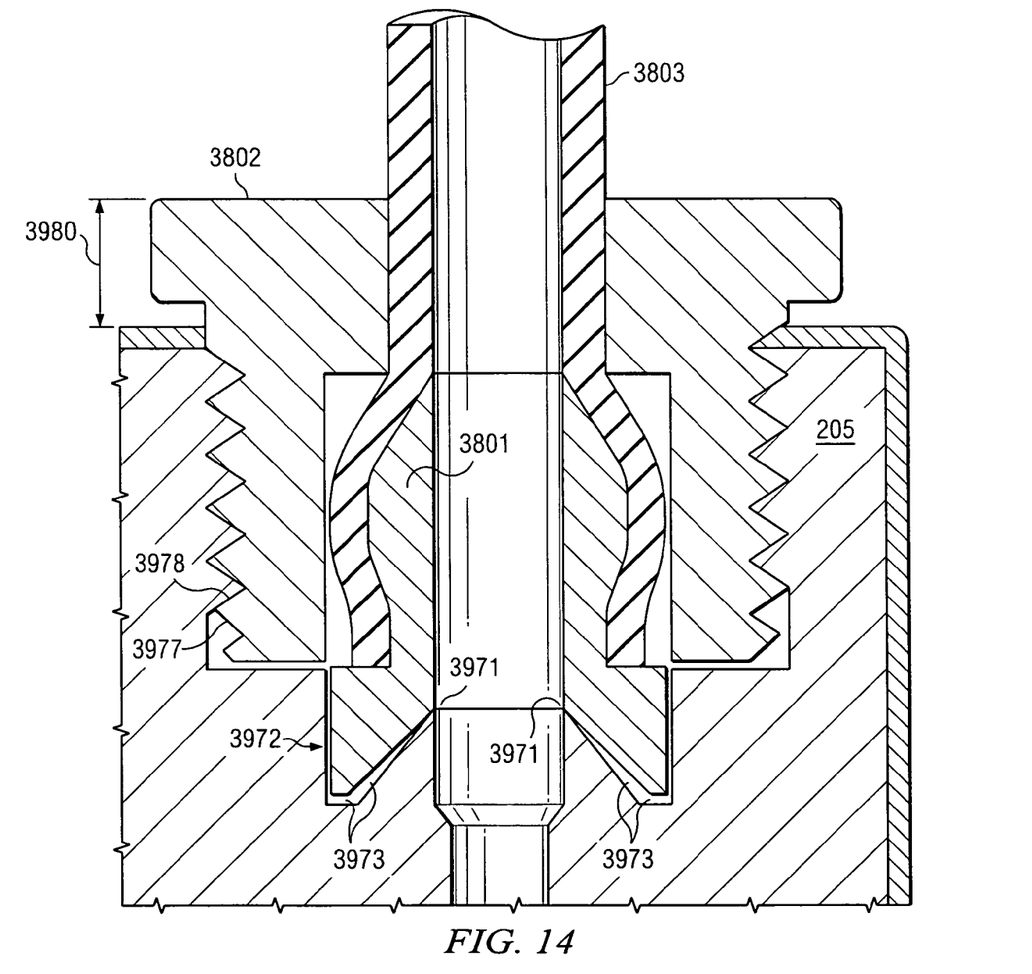
FIG. 14 is a cross-sectional view of the fitting assembly, the tube, and the block of FIG. 11, according to another embodiment of the invention.

In one embodiment, fitting 3801 can be a commercially available sleeve that can serve as a cap end for tube 3803 and fit inside the screw end of locking nut 3802 (see cross-sectional view shown in FIG. 14). The inner diameter of locking nut 3802 is sufficiently large to fit the outer diameter of tube 3803. As can be seen in FIG. 11, tube 3803 and locking nut 3802 are not physically attached (i.e., one can spin locking nut 3802 around tube 3803). Decoupling tube 3803 and locking nut 3802 advantageously eliminates unscrewing issues related to movements of tube 3803.

Figure 12:
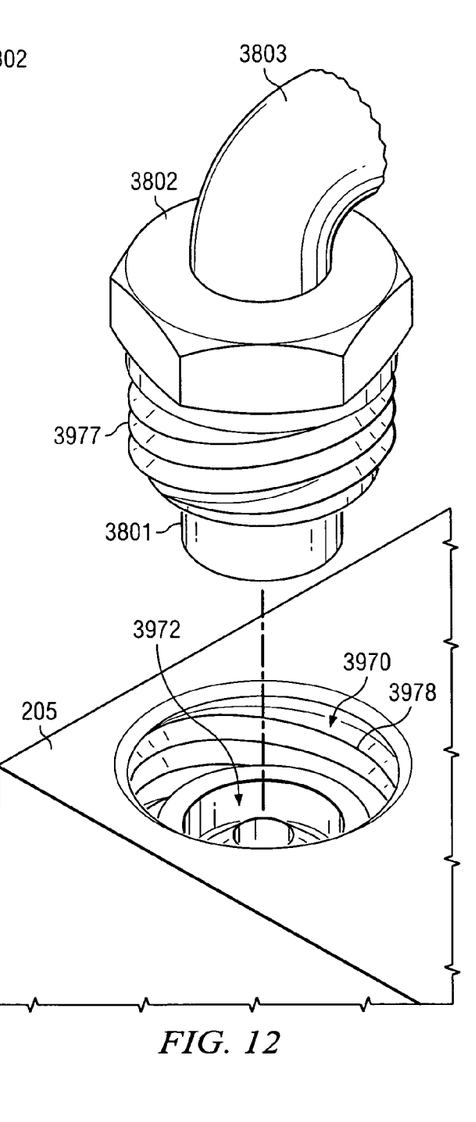
FIG. 12 is a perspective view of a receiving hole machined out of the block of FIG. 11 for receiving the tube and the fitting assembly of FIG. 11, according to another embodiment of the invention.

FIG. 12 is a perspective view of a receiving hole machined according to another embodiment of the invention. More specifically, receiving hole 3970 is machined out of dispense block 205 for receiving tube 3803 and fitting assembly 3800. As will be described in detail with reference to FIG. 15, one embodiment of receiving hole 3970 is an external inlet connecting a flow path of dispense block 205 with a fluid line of pump 100. One skilled in the art will appreciate that embodiments of fluid fitting assemblies disclosed herein can be utilized to connect external inlets as well as outlets of various dispense blocks to fluid lines and thus are not limited by what is shown here. As illustrated in FIG. 12, dispense block 205 can have more than one receiving holes 3970, each of which is machined with female threads 3978 to match male threads 3977 of locking nut 3802 and with recess area 3972 to match the contour of the end of fitting 3801 that sticks out of tube 3803.

Figure 13:
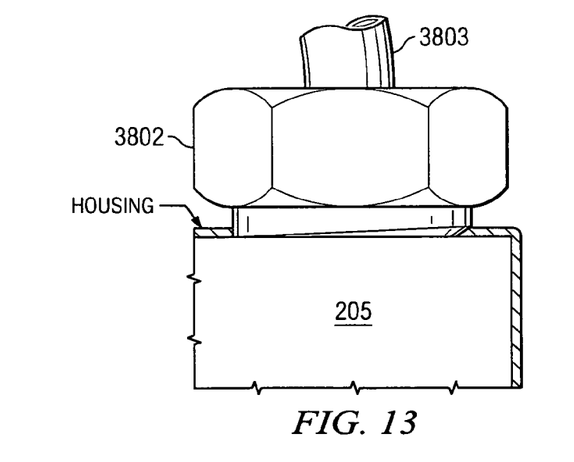
FIG. 13 is a side view of the fitting assembly, the tube, and the block of FIG. 11, according to one embodiment of the invention.

FIG. 13 is a side view showing fitting assembly 3800 being assembled onto dispense block 205, according to one embodiment of the invention. More specifically, FIG. 13 shows locking nut 3802 partially screwed into receiving hole 3970 (not shown) of dispense block 205. Because locking nut 3802 and tube 3803 are not physically attached, movements (e.g., bending) of tube 3803 does not affect locking nut 3802 (e.g., bending tube 3803 will not cause locking nut 3802 to loosen up or become unscrewed).

FIG. 14 is a cross-sectional view of FIG. 13, according to another embodiment of the invention. FIG. 14 exemplifies the low profile characteristic of fluid fitting assembly 3800. The only part of fluid fitting assembly 3800 that sticks out dispense block 205 is limited by height 3980. In one embodiment height 3980 is about a quarter of an inch (0.25"). Regardless of the shape, the head of locking nut 3802 can be trimmed down to reduce height 3980, the portion of fitting assembly 3800 protruding from dispense block 205. In one embodiment, this is achieved by machining locking nut 3802 with less height and adding holes similar to holes 3604 of locking nut 3600 on to top face of locking nut 3802. Locking nut 3802 can look like locking nut 3602, without the wrench flats.

In the example of FIG. 14, initially, as locking nut 3802 screws fitting 3801 in place, part of fitting 3801 touches or contacts part of receiving hole 3970 at points 3971 (i.e., similar to where seal surface 3505 interfaces with inner diameter 3507 of fitting 3500 as described above with reference to FIG. 9). There may be one or more slight gaps 3973 between surfaces of fitting 3801 and receiving hole 3970. Gaps 3973 as shown in FIG. 14 are meant to be exemplary. Actual size of gaps 3973 may vary from implementation to implementation. As will be explained later, having fitting 3801 to contact dispense block 205 at points 3971 advantageously eliminates dead spaces, in addition to completing the seal between fitting 3801 and dispense block 205.

One skilled in the art can appreciate that tube 3803 is not limited to what is shown in FIGS. 11-14. In some embodiments, tube 3803 can be a tube-like adaptor having one end connecting fitting 3801 with a tube or another tube-like apparatus. The other end can vary from implementation to implementation. Such a tube-like adaptor 3803 can be modified to suit, connecting a variety of devices with dispense block 205 through fitting 3801 and locking nut 3802, which can be particularly useful in retro-fitting existing air and/or fluid fittings.

Fitting 3801 is designed to be made of a material that has higher compressibility than that of dispense block 205. Moreover, fitting 3801 has a bulging section that pushes tube 3803 slightly against the inner wall of locking nut 3802. Locking nut 3802 is designed to have recess area 3972 (similar to recess area 3609 of locking nut 3600) that serves as a stopper and catches tube 3803. In this way, as locking nut 3802 screws into dispense block 205, the inner wall of locking nut 3802 pushes tube 3803 down which, in turn, presses fitting 3801 down against dispense block 205. As locking nut 3802 continues to press down (i.e., by tightening locking nut 3802 with a tool such as a torque wrench), the end part of fitting 3801 begins to deform and fill gaps 3973 (starting from points 3971 towards recess area 3972), completing the seal between fitting 3801 and dispense block 205.

Figure 15:
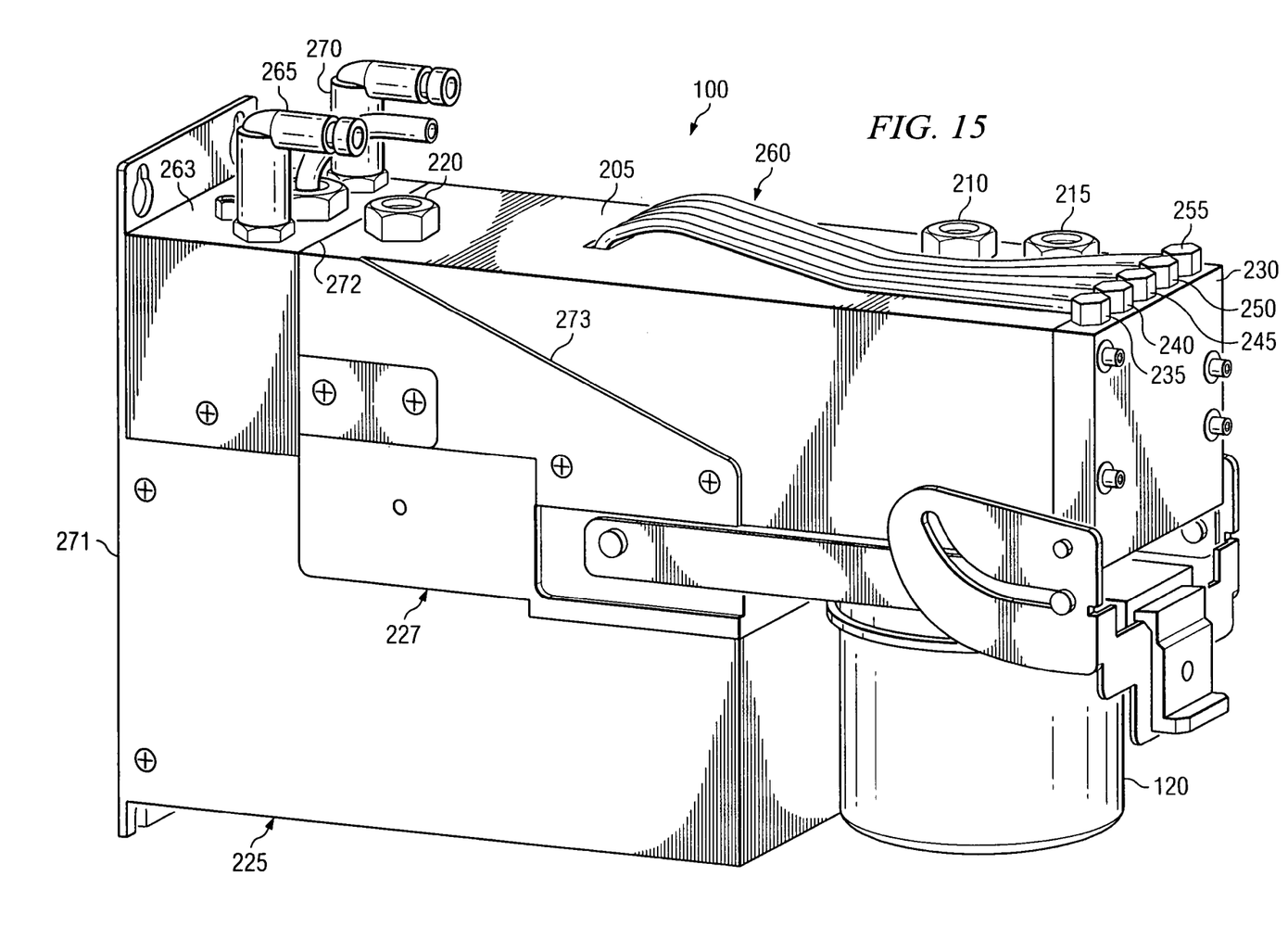
FIG. 15 is a diagrammatic representation of a pump assembly for a multi-stage pump, showing embodiments of the invention assembled thereto.

FIG. 15 is a diagrammatic representation of one embodiment of a pump assembly for pump 100. Pump 100 can include a dispense block 205 that defines various fluid flow paths through pump 100 and at least partially defines feed chamber 155 and dispense chamber 185. Dispense pump block 205 can be a unitary block of PTFE, modified PTFE or other material. Because these materials do not react with or is minimally reactive with many process fluids, the use of these materials allows flow passages and pump chambers to be machined directly into dispense block 205 with a minimum of additional hardware. Dispense block 205 consequently reduces the need for piping by providing an integrated fluid manifold.

Dispense block 205 can include various external inlets and outlets including, for example, inlet 210 through which the fluid is received, vent outlet 215 for venting fluid during the vent segment, and dispense outlet 220 through which fluid is dispensed during the dispense segment. Embodiments of the invention disclosed herein can be utilized to connect the external inlets and outlets, including external purge outlets, of dispense block 205 to fluid lines. More specifically, one embodiment of fitting assembly 3800 can be implemented as an input fluid fitting assembly for inlet 210, one embodiment of fitting assembly 3800 can be implemented as a vent fitting assembly for vent outlet 215, and one embodiment of fitting assembly 3800 can be implemented as an output fitting assembly for dispense output 220. Other implementations for fluid connections are also possible.

Dispense block 205 routes fluid to a feed pump (not shown), a dispense pump (not shown), and filter 120. Pump cover or housing 225 can protect the feed motor and the dispense motor from damage, while piston housing 227 can provide protection for the pistons (not shown). Either housing can be formed of polyethylene or other polymer. Valve plate 230 provides a valve housing for a system of valves (not shown) that can be configured to direct fluid flow to various components of multi-stage pump 100. Valve plate 230 includes several valve control inlets (e.g., 235, 240, 245, 250, 255), each corresponds to a valve for applying pressure or vacuum to its corresponding diaphragm. By the selective application of pressure or vacuum to inlets 235, 240, 245, 250, 255, the corresponding valves are opened and closed. Additional teachings related to inlets 235, 240, 245, 250, and 255 can be found in the above-referenced U.S. Patent Application Ser. No. 60/742,435, filed Dec. 5, 2005, entitled "SYSTEM AND METHOD FOR MULTIPLE-STAGE PUMP WITH REDUCED FORM FACTOR" by Gonnella et al.

A valve control gas and vacuum are provided to valve plate 230 via valve control supply lines 260, which run from a valve control manifold (covered by top cover 263), through dispense block 205 to valve plate 230. Valve control gas supply inlet 265 provides a pressurized gas to the valve control manifold and vacuum inlet 270 provides vacuum (or low pressure) to the valve control manifold. The valve control manifold acts as a three way valve to route pressurized gas or vacuum to the appropriate inlets of valve plate 230 via supply lines 260 to actuate the corresponding valve(s).

FIG. 15 also illustrates several features that can prevent fluid drips from entering the area of multi-stage pump 100 housing electronics. Fluid drips can occur, for example, when an operator connects or disconnects a tube from inlet 210, outlet 215 or vent 220. The "drip-proof" features are designed to prevent drips of potentially harmful chemicals from entering the pump, particularly the electronics chamber and do not necessarily require that the pump be "water-proof"(e.g., submersible in fluid without leakage). According to other embodiments, the pump can be fully sealed.

According to one embodiment, dispense block 205 can include a vertically protruding flange or lip 272 protruding outward from the edge of dispense block 205 that meets top cover 263. On the top edge, according to one embodiment, the top of top cover 263 is flush with the top surface of lip 272. This causes drips near the top interface of dispense block 205 and top cover 263 to tend to run onto dispense block 205, rather than through the interface. On the sides, however, top cover 263 is flush with the base of lip 272 or otherwise inwardly offset from the outer surface of lip 272. This causes drips to tend to flow down the corner created by top cover 263 and lip 272, rather than between top cover 263 and dispense block 205. Additionally, a rubber seal is placed between the top edge of top cover 263 and back plate 271 to prevent drips from leaking between top cover 263 and back plate 271.

Dispense block 205 can also include sloped feature 273 that includes a sloped surface defined in dispense block 205 that slopes down and away from the area of pump 100 housing electronics. Consequently, drips near the top of dispense block 205 are lead away from the electronics. Additionally, pump cover 225 can also be offset slightly inwards from the outer side edges of dispense block 205 so that drips down the side of pump 100 will tend to flow past the interface of pump cover 225 and other portions of pump 100.

According to one embodiment of the present invention, wherever a metal cover interfaces with dispense block 205, the vertical surfaces of the metal cover can be slightly inwardly offset (e.g., 1/64 of an inch or 0.396875 millimeters) from the corresponding vertical surface of dispense block 205. Additionally, multi-stage pump 100 can include seals, sloped features and other features to prevent drips from entering portions of multi-stage pump 100 housing electronics. Back plate 271 can include features to further "drip-proof" multi-stage pump 100.

Embodiments of multi-stage pump 100 as shown in FIGS. 10 and 15 have a compact design. To this extent, embodiments of the o-ring-less low profile fittings and fitting assemblies disclosed herein can be highly desirable and valuable. More specifically, fitting assembly 3700 can be particularly useful for filter connections, as shown in FIG. 10, and fitting assembly 3800 can be particularly useful for fluid connections, as shown in FIG. 15.

Figures 16, 17:
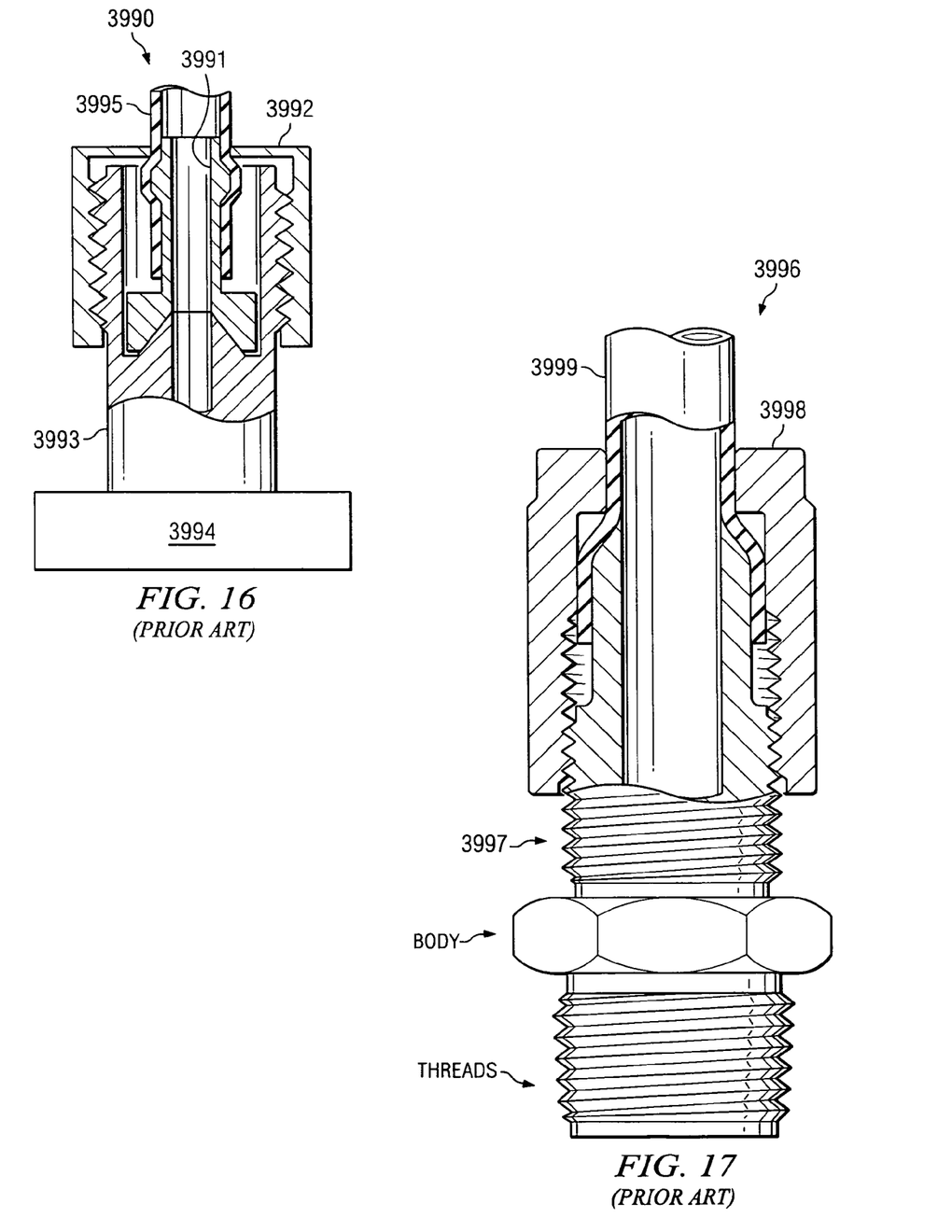
FIG. 16 is a diagrammatic representation of a prior art fitting assembly which fits over a stem protruding from a manifold.
FIG. 17 is a diagrammatic representation of another prior art fitting assembly which uses an adapter.

FIG. 16 is a diagrammatic representation of a prior art fitting assembly which fits over a stem protruding from a manifold. More specifically, fitting assembly 3990 comprises fitting 3991 and nut 3992. Fitting 3991 is inserted into stem 3993 which sticks out of manifold 3994 and which is male-threaded on the outside. Tube 3995 is pressed down onto fitting 3991 and over stem 3993 by nut 3992, which is female-threaded on the inside. There are several drawbacks. First, fitting assembly 3990 has a large profile, which is not a desirable feature in fluid pumps. Second, it is difficult and costly, if not time consuming and wasteful, to machine stem 3993 out of manifold 3994. More importantly, there is not a tight seal between fitting 3991 and manifold 3994, which means leakage could be a problem. Furthermore, dead spaces can be found between fitting 3991 and nut 3992, which means fluid crystallization could be a problem. Finally, the bulky design of fitting assembly 3990 likely cause issues when tube 3995 is bent.

FIG. 17 is a diagrammatic representation of another prior art fitting assembly which uses an adapter. More specifically, fitting assembly 3996 comprises adapter 3997 and nut 3998 for connecting flared tubing 3999 to a manifold (not shown). Nut 3998 is female-threaded on the inside to screw on adapter 3997, which is male-threaded on the outside. When installed, other than the threaded portion below its body, the rest of fitting assembly 3996 sticks out of the manifold much like stem 3993 sticks out of manifold 3994 as shown in FIG. 16. With this prior design, drawbacks such as leakage and dead spaces remain. Furthermore, the bulkiness and large profile likely to cause issues when flared tubing 3999 is bent.

Embodiments of the fitting assemblies disclosed herein have many space-saving features and characteristics, advantageously achieving a desirable low profile with minimal protrusion from a manifold while ensuring a secure seal between each fitting and the manifold. For example, an o-ring-less low profile connection/fitting assembly allows a filter (e.g., filter 120 of FIG. 15), tube (e.g., tube 3803 of FIG. 14), or tube-like adaptor to be closely attached to a manifold (e.g., dispense block 205), which helps to desirably reduce the overall dimension of the pump that embodies the manifold, which, in turn, helps to reduce the overall dimension of a pumping system that embodies the pump(s). The low profile design also helps to reduce effects associated with tube movements.

Another advantage relates to the reusability of the fitting assemblies disclose herein. Specifically, an o-ring-less low profile fitting assembly can be disassembled and then reassembled (i.e., reused) several times without losing the seal or causing a leakage problem. For example, filter fitting assembly 3700 can be disassembled by unscrewing locking nut 3600 and then reassembled by tightening locking nut 3600 again. Because of the elasticity of fitting 3500, the tightening of locking nut 3600 can complete the seal between fitting 3500 and dispense block 250 in a similar manner as it was first assembled. Similarly, fluid fitting assembly 3800 can be disassembled by unscrewing locking nut 3802 and then reassembled by tightening locking nut 3802 again to complete the seal between fitting 3801 and dispense block 205.

As yet another example, referring to FIG. 9, fitting assembly 3700 is shown to protrude from dispense block 205 by height 3780. In one embodiment, height 3780 is about 0.20 inch or less. However, so long as one can torque locking nut 3600 with a proper tool, it is possible to machine the receiving hole 3770 to a depth and configuration that accommodates the height and configuration of locking nut 3600 (e.g., flat surface of first end 3601 of locking nut 3600 is level with or slightly lower than surface of dispense block 205). Fitting assembly 3800 can be similarly modified.

In addition to the advantageous features and characteristics described above, one important advantage of the invention is that no o-rings are required. The elimination of the o-ring eliminates all the drawbacks associated with o-rings (e.g., prone to leaks, limited lifespan, etc.) in prior fittings and fitting assemblies.

Another advantage is that a fitting assembly according to embodiments of the invention disclosed herein can provide a tight seal that, in addition to preventing leakage, eliminates or substantially reduces dead spaces where fluid may crystallize. As an example, referring to FIG. 9, as described above, initially, fitting 3500 touches or contacts dispense lock 205 at points 3771, leaving slight gaps 3773 between surfaces of first end 3501 of fitting 3500 and recess area 3772 of receiving hole 3770. Gaps 3773 are subsequently eliminated as described above, avoiding crystallization of fluid in the dead zone. Having fitting 3500 and dispense block 2005 first contact at points 3771 ensures a tight fit and proper seal. Otherwise, if fitting 3500 and dispense block 205 do not first meet at points 3771, gaps 3773 may be filled before a seal is complete, leaving a possible dead zone in the flow path around points 3771. For similar reasons, dead zones and gaps are advantageously eliminated in the embodiment shown in FIG. 14.

Yet another advantage is the reduced cost in machining receiving hole(s) 3770 and/or receiving hole(s) 3970 out of dispense block 205. Prior pumping systems use pillar style fittings and female threaded nut, which requires pillar style structures (e.g., stems) with male threads to match. In addition to their bulky size and large profile, these stems are difficult and wasteful to machine out of a dispense block. The low profile design of filter fitting assembly 3700 and fluid fitting assembly 3800 minimizes the amount of material and steps necessary to machine corresponding receiving hole(s), effectively saving material, space, time, and money.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the scope and spirit of this invention. Accordingly, the scope of the invention should be determined by the following claims and their legal equivalents.

What is claimed is:

1. An o-ring-less low profile fitting assembly, comprising:
   an o-ring-less low profile fitting having a first end and a second end, wherein said first end of said o-ring-less low profile fitting has a rim, wherein said rim is deformable, wherein said o-ring-less low profile fitting is made of a single piece of material; and
   a low profile locking nut pressing down said o-ring-less low profile fitting into a recess area inside a receiving hole machined out of a manifold and deforming said rim of said first end to complete a seal between said o-ring-less low profile fitting and said manifold, wherein said first end of said o-ring-less low profile fitting is structured to mate with said recess area inside said receiving hole, wherein said manifold is made of a first material, wherein said o-ring-less low profile fitting is made of a second material, wherein said second material has higher compressibility than said first material, wherein said low profile locking nut has a first end, a second end, and a male threaded portion, and wherein said male threaded portion of said low profile locking nut is structured to mate with a female threaded portion of said receiving hole.

2. The o-ring-less low profile fitting assembly of claim 1, wherein said first end of said o-ring-less low profile fitting has a fitting seal surface structured to mate with a receiving seal surface of said receiving hole.

3. The o-ring-less low profile fitting assembly of claim 2, wherein said o-ring-less low profile fitting further comprises a thru hole, wherein said fitting seal surface is defined by a first diameter of said rim and a second diameter of said thru hole and wherein said fitting seal surface slopes from said rim to said thru hole.

4. The o-ring-less low profile fitting assembly of claim 3, wherein said fitting seal surface has a plurality of points interfacing said thru hole and wherein said plurality of points are structured to touch said manifold before a portion of said rim touches said manifold.

5. The o-ring-less low profile fitting assembly of claim 1, wherein said second end of said o-ring-less low profile fitting is structured for receiving or fitting into a tubular connection.

6. The o-ring-less low profile fitting assembly of claim 5, wherein said tubular connection is a fluid connection or a filter connection.

7. The o-ring-less low profile fitting assembly of claim 1, wherein said o-ring-less low profile fitting has a first protuberance and a second protuberance.

8. The o-ring-less low profile fitting assembly of claim 7, wherein a difference between diameters of said first protuberance and said second protuberance allows said low profile locking nut to slide over said second protuberance and be stopped by said first protuberance.

9. The o-ring-less low profile fitting assembly of claim 1, wherein said first end of said low profile locking nut has a flat surface with one or more holes.

10. The o-ring-less low profile fitting assembly of claim 1, wherein said second end of said low profile locking nut has two different inner diameters and a stopper inside said second end, and wherein said stopper is defined by said two different inner diameters for catching a protuberance of said o-ring-less low profile fitting.

11. An o-ring-less low profile fitting, comprising:
   a thru hole;
   a first end having
      a rim having a first inner diameter, wherein said rim is deformable and wherein said thru hole has a second inner diameter;
      a fitting seal surface defined by said first inner diameter of said rim and said second diameter of said thru hole, wherein said fitting seal surface slopes from said rim to said thru hole; and
      a first protuberance supporting said fitting seal surface and having a first outer diameter;
      a second protuberance supporting said second end and having a second outer diameter, wherein said second outer diameter is structured to pass through a bore of a low profile locking nut and wherein said first-protuberance is structured to abut a portion of said low profile locking nut.

12. The o-ring-less low profile fitting of claim 11, wherein said rim has a higher compressibility than said low profile locking nut.

13. The o-ring-less low profile fitting of claim 11, wherein said first end is structured to mate with a bottom portion of a receiving hole machined out of a manifold having a lower compressibility than said o-ring-less low profile fitting.

14. The o-ring-less low profile fitting of claim 13, wherein said fitting seal surface is structured to mate with a receiving seal surface inside said receiving hole, and wherein pressing down said fitting seal surface of said o-ring-less low profile fitting causes the fitting seal surface to mate with said receiving seal surface inside said receiving hole and deforms said rim of said first end to fill gaps at said bottom portion of said receiving hole and completes a seal between said o-ring-less low profile fitting and said manifold.

15. The o-ring-less low profile fitting of claim 14, wherein said fitting seal surface has a plurality of points interfacing said thru hole and wherein said plurality of points are structured to touch said manifold before a portion of said rim touches said manifold.

16. The o-ring-less low profile fitting of claim 13, wherein said second end is structured for receiving or fitting into a tubular connection.

17. The o-ring-less low profile fitting of claim 16, wherein said tubular connection is a fluid connection or a filter connection.

18. The o-ring-less low profile fitting of claim 13, wherein said o-ring-less low profile fitting is made of a single piece of material.

* * * * *